W. A. TURBAYNE.
DYNAMO ELECTRIC MACHINE.
APPLICATION FILED DEC. 26, 1912.

1,250,718.

Patented Dec. 18, 1917.
2 SHEETS—SHEET 1.

Witnesses:
Robert F. Weir
R. H. Van Nest

Inventor:
William A. Turbayne
By Edwin B. H. Tower Jr. Atty.

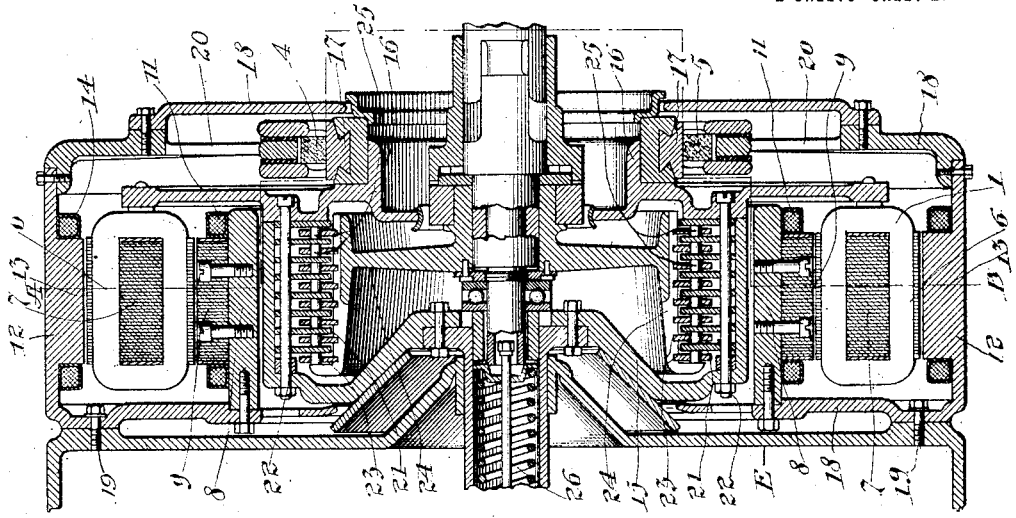

UNITED STATES PATENT OFFICE.

WILLIAM A. TURBAYNE, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

DYNAMO-ELECTRIC MACHINE.

1,250,718.   Specification of Letters Patent.   Patented Dec. 18, 1917.

Application filed December 26, 1912. Serial No. 738,629.

*To all whom it may concern:*

Be it known that I, WILLIAM A. TURBAYNE, a citizen of the United States, residing at Niagara Falls, in the county of Niagara and State of New York, have invented new and useful Improvements in Dynamo-Electric Machines, of which the following is a full, clear, concise, and exact description, reference being had to the accompanying drawing, forming a part of this specification.

This invention relates to an improved dynamo electric machine.

More particularly, the invention relates to an improved dynamo electric machine adapted for efficient operation as a motor where great variations in speed are desired or for operation as a generator in which it is desired to compensate for great variations in speed or from which wide variations in voltage are desired.

An object of the invention is to provide a motor of increased efficiency.

Another object of the invention is to provide a motor having a ring-wound armature in which all the armature conductors are effective in exerting torque.

Another object of the invention is to provide a variable speed generator which is self-regulating within narrow limits.

Another object is to provide a variable speed generator in which the tendency to spark at the brushes is inherently eliminated.

Another object is to provide an improved dynamo electric machine adapted for use without an auxiliary regulator as the starting motor and lighting generator in an automobile self-starter.

The preferred construction of the dynamo electric machine and one of the various combinations in which it is especially efficient are illustrated in the accompanying drawings, in which—

Fig. 5 is a vertical section on the line A—B, Fig. 6, at right angles to the armature shaft of the machine when used in connection with an automobile self-starter.

Fig. 6 is a vertical section through Fig. 5.

Figure 1:
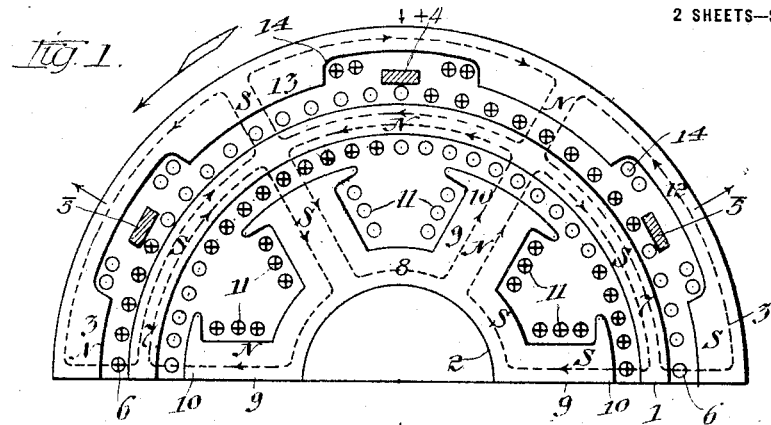
Figure 1 illustrates diagrammatically the dynamo electric machine when operating as a motor.

The dynamo electric machine comprises an armature 1 of the Gramme or ring-wound type, internal field magnets 2, external field magnets 3, positive brushes 4 and negative brushes 5.

The armature 1 comprises a suitable number of windings 6 on a laminated, or other form of ring, 7.

The internal field comprises a yoke 8, preferably of iron, provided with poles 9 having pole faces 10 and windings 11.

The external field comprises a circular yoke 12 provided with poles 13 having windings 14.

Figure 2:
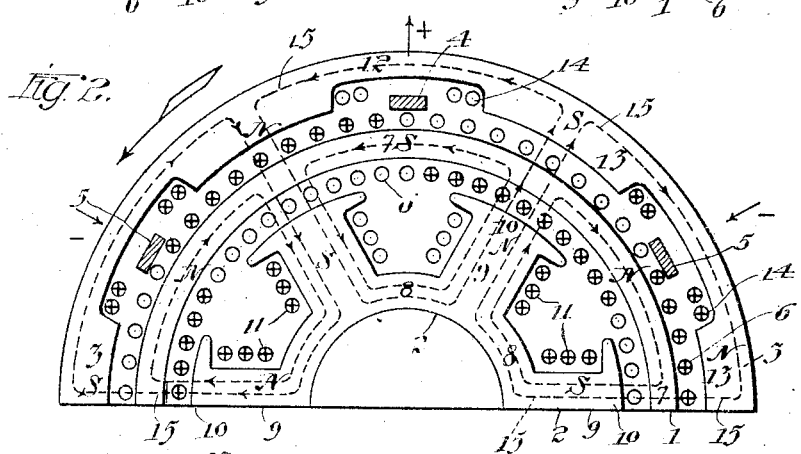
Fig. 2 illustrates diagrammatically the dynamo electric machine when operating as a generator.

In Figs. 1 and 2 the magnetic flux is indicated by broken lines, the direction being indicated by the arrow-heads. The direction of the current in the various conductors is indicated by crosses and dots, the crosses indicating that the current flows downward in the direction away from the observer, and the dots indicating that the current flows upward or toward the observer. The feathered arrows indicate the direction of rotation of the armature.

In order to obtain an efficient motor in which all armature conductors are effective in exerting torque, the external and internal fields are energized as indicated in Fig. 1 so that adjacent external and internal poles are of like polarity. While flux from these adjacent poles will, therefore, pass through the armature core in the same direction, the flux from the respective poles will cross the external and internal armature conductors in opposite directions. Therefore, both external and internal turns of the armature will exert torque in the direction indicated by the feathered arrow.

With but a single set of poles, for example, the internal poles, not only would the external armature conductors not be effective to assist the internal conductors in exerting torque but in most cases would actually exert a contrary effect. Thus when, as is customary in certain classes of work, it is necessary to operate the armature at a comparatively high flux density a certain amount of magnetic flux would pass beyond the armature core which, by its action on the external conductors, would produce a torque opposing that produced by the internal conductors.

In order to obtain a variable speed generator which is self-regulating and in which sparking at the brushes is eliminated the external and internal fields are oppositely energized as indicated in Fig. 2. This is generally accomplished by connecting the windings on the internal poles in shunt to the armature and connecting the windings on the external poles in opposition thereto in series. These connections will cause the adjacent external and internal poles to be of opposite polarity. This will result in magnetic flux being diverted from the armature core, as indicated by the dotted lines 15, Fig. 2, in degree depending upon the value of current in the external or series field windings 14. It will be obvious that current through these coils 14 and, therefore, the total current furnished by the generator to the external circuit cannot attain a value sufficient to cause the exciting force of the external field poles to equal that of the internal field poles, for should this condition obtain the E. M. F. set up in the external and internal armature conductors would be equal and the resulting E. M. F. across the brushes of the generator would be zero, an obviously impossible condition regardless of the speed of rotation of the generator.

Regulation of the generator output does not depend upon the differential action of the series winding in reducing the initial flux set up by the shunt winding, but depends on the C. E. M. F. developed in the external armature conductors in passing through the flux diverted from the armature core and directed into the external field poles.

Furthermore, on account of the greater polar embrace of the external pole faces as compared with the internal pole faces and also the greater width of armature teeth on the outer armature periphery, assuming an equivalent air gap clearance, the magnetic reluctance of the external magnetic circuit will be very much less than that of the internal. Consequently the windings acting on the external poles will be much more effective than would be the case if these windings acted on the internal poles as in the case of an ordinary differential machine regulating by reason of the differential action of windings arranged on the same poles.

The flux in the internal poles does not change in direction or magnitude nor does the symmetry axis of the flux become altered, since the tendency to distortion of the flux by reason of the armature currents will be substantially canceled. Thus, although the internal armature conductors will have a generator reaction tending to distort the flux in the direction of rotation, the outer armature conductors will have a motor reaction tending to distort the flux in the opposite direction, so that the coils undergoing commutation will be in a substantially neutral field.

A machine of this character is especially adapted for use in an automobile self starter in which the machine first operates as a motor to start the engine and thereafter as a generator driven by the engine to light the lamps and charge the storage battery.

Figures 3, 4:
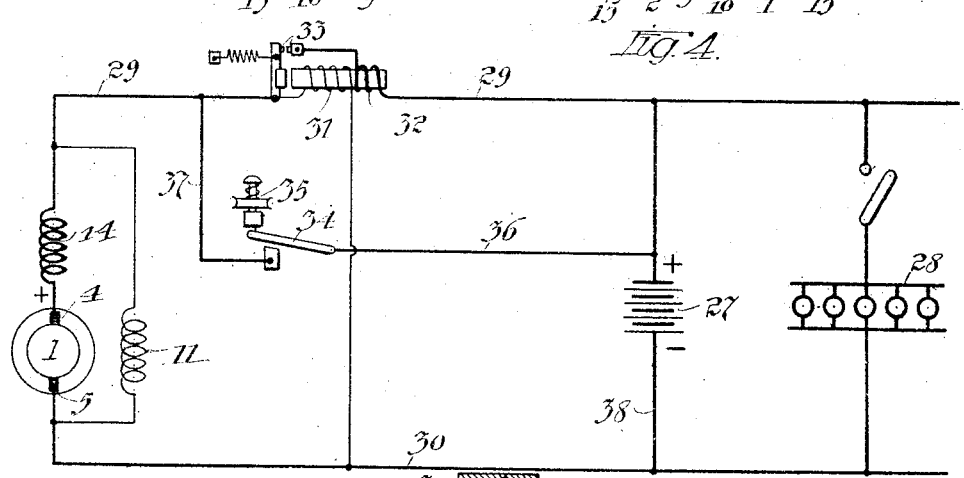
Fig. 3 illustrates diagrammatically a section through the armature and one set of poles.
Fig. 4 illustrates diagrammatically the circuits employed when the machine is used in connection with an automobile self-starter.

Fig. 4 illustrates the circuit connections and Figs. 5 and 6 illustrate the mechanical details when the improved dynamo electric machine is used in an automobile self starter.

In these figures the elements which correspond to elements described in connection with Figs. 1 and 2, are designated by the same reference characters.

The armature 1 is preferably proportioned to act as the fly wheel for the automobile engine. The laminated armature ring 7, slotted to receive the armature coils 6, is carried by a cylindrical carrier 15, secured to the engine shaft. A flange 16 on the carrier supports the commutator 17.

The internal field yoke 8 with its pole pieces 9 and windings 11, and the external field yoke 12 with its pole pieces 13 and windings 14 are carried by an inclosing casing 18, bolted to the engine frame E as at 19.

Brushes 4 and 5 are carried by arms 20 extending from the casing 18.

Any suitable form of automobile driving clutch may be used. The form chosen for illustration is of the multiple disk type in which one set of clutch members 21 are loosely carried by bolts 22 mounted in the cylindrical carrier 15. The coöperating clutch members 23 are carried in the annular frame 24, mounted for rotation and limited endwise movement with respect to the engine shaft. The frame 24 is suitably coupled to the driving shaft of the automobile. Friction inserts 25 provide the required friction surfaces between the coöperating clutch members. The clutch members are adapted to be engaged or disengaged in the usual manner by movement of the frame 24 longitudinally of the engine shaft. The spring 26, through suitable mechanical connections, tends to hold the clutch members in engagement.

The electrical connections are illustrated in Fig. 4. The internal field windings 11 are preferably connected in shunt across the generator brushes, while the external field windings 14 are preferably connected in series with the armature. A battery 27 and lamps or other devices 28, are connected in parallel branches across the generator leads 29 and 30. An automatic switch of any preferred type is preferably provided in one of the generator leads. A shunt closing coil 31 and a series holding coil 32 control contacts 33 to automatically connect and disconnect the generator and the battery and lamps depending on the generator voltage.

An auxiliary starting switch 34 is controlled by a foot pedal or other device 35, and controls a motor circuit whereby current may be supplied from the battery to energize the motor for starting purposes.

The engine is started by closing the manually controlled switch 34, thus supplying current to the dynamo electric machine from battery 27 through conductor 36, switch 34, conductor 37, main lead 29, series field 14, positive brushes 4, armature 1, negative brushes 5, conductors 30 and 38 to the negative terminal of the battery. The shunt field coils 11 are also energized so that, as illustrated in Fig. 1, the shunt and series coils act together to produce a high torque for starting the engine.

After the engine has started, the manual switch may be released, whereupon the dynamo electric machine will operate as a simple shunt wound generator rapidly increasing in voltage until the predetermined voltage is attained at which the automatic switch closes. The external and internal fields will now become energized as illustrated in Fig. 2 and although the engine speed may increase greatly, the generator will be automatically regulated to maintain the voltage within safe limits for charging the battery and supplying the lamps.

By employing this improved dynamo electric machine in an automobile self starter, it is possible to operate the motor with a comparatively high flux density in the armature core for the magnetic flux which passes beyond the core not only does not counteract the starting torque, but assists the same. Furthermore, when operating as a generator, the auxiliary regulators ordinarily required to regulate the generator output throughout the wide range of speed at which such machines are customarily operated, may be dispensed with and at the same time practically sparkless commutation is assured.

The embodiment of the invention herein described is, of course, for the purpose of illustration only, as it is apparent that many modifications and changes may be employed, all of which fall within the scope of the invention which is defined in the appended claims.

While the dynamo electric machine herein described is especially adapted for use in an automobile self starter, it is also susceptible of other uses. Thus, among other uses, it may be employed as a variable speed motor or as a booster or exciter possessing special advantages. These and other adaptations will be described and claimed in other applications.

What I claim as new and desire to secure by Letters Patent is:

1. An electric motor provided with a ring-wound armature, external field poles adjacent the outer periphery of said armature, and internal field poles adjacent the inner periphery of said armature, each external pole being opposite in position to and of like polarity to an internal pole.

2. An electric motor provided with a ring-wound armature, external field poles, internal field poles opposite each external field pole, and means for energizing said field poles so that adjacent external and internal poles are of like polarity whereby outer and inner turns of the armature conductor may exert torque in the same direction.

3. An electric motor provided with a ring-wound armature, an external field yoke provided with poles adjacent the outer periphery of said armature, and an internal field yoke provided with poles adjacent the inner periphery of said armature, each external pole being adjacent an internal pole and of like polarity thereto.

4. An electric motor provided with a ring wound armature, an external field yoke provided with poles adjacent the outer periphery of said armature, an internal field yoke provided with poles adjacent the inner periphery of said armature, windings in series with the armature on the external poles, and windings connected across the motor leads on said internal poles, said windings being so connected that adjacent external and internal poles are of like polarity, whereby outer and inner turns of the armature conductor may exert torque in the same direction.

5. A generator provided with a ring-wound armature, external field poles adjacent said armature, and internal field poles adjacent said armature, adjacent external and internal poles being of opposite polarity.

6. A self-regulating variable speed generator provided with a ring-wound armature, external field poles adjacent said armature, internal field poles adjacent said armature, an external pole being opposite in position to each internal pole, and means for energizing said poles so that adjacent external and internal poles are of opposite polarity.

7. A self-regulating variable speed generator provided with a ring-wound armature, an external field yoke provided with poles adjacent the outer periphery of said armature, an internal field yoke provided with poles adjacent the inner periphery of said armature, each external pole being adjacent an internal pole, windings in shunt to the generator on the internal poles, and windings in series with the generator on the external poles, said windings being so connected that adjacent external and internal poles are of opposite polarity, whereby the E. M. F. generated in the outer armature turns will oppose the E. M. F. generated in the inner armature turns.

8. A variable speed generator provided with a ring-wound armature, external field poles, and an oppositely energized internal field pole opposite each external field pole whereby tendency to field distortion caused by the inner armature turns will be counteracted by that caused by the outer armature turns.

9. A dynamo electric machine having a ring-wound armature, internal field poles connected in shunt to said armature, an external field pole opposite each internal field pole, said external field poles being connected in series with said armature and energized to have unlike polarity to the adjacent internal field pole, whereby said dynamo electric machine is rendered self-regulating throughout all ranges of speed.

10. A self-regulating variable speed generator having a ring-wound armature, a shunt field creating a flux cut by the inner turns of said armature, and a series field diverting flux from said armature, said diverted flux being cut by the outer turns of said armature whereby said outer turns set up an E. M. F. opposed to that set up by the said inner turns.

11. A self-regulating variable speed generator provided with a ring-wound armature, means for creating a flux in the path of the inner turns of said armature, and means for creating a flux in the path of the outer turns of said armature in such a direction as to set up in the outer armature turns an E. M. F. opposing the E. M. F. set up in the inner armature turns.

12. A motor having a ring-wound armature, field windings creating a flux passing through said armature core, additional field windings creating a flux entering said armature core from the opposite side thereof, but passing therethrough in the same direction whereby both outer and inner turns of said armature are effective to produce torque in the same direction In witness whereof, I have hereunto subscribed my name in the presence of two witnesses.

WILLIAM A. TURBAYNE.

Witnesses:
JAMES L. COUGHLIN,
F. J. CALLAHAN.

Copies of this patent may be obtained for five cents each, by addressing the "Commissioner of Patents, Washington, D. C."